US010248397B2

(12) United States Patent
Dain

(10) Patent No.: US 10,248,397 B2
(45) Date of Patent: *Apr. 2, 2019

(54) INTELLIGENT AND AUTOMATED CODE DEPLOYMENT

(71) Applicant: INTERNATIONAL BUSINESS MACHINES CORPORATION, Armonk, NY (US)

(72) Inventor: Joseph W. Dain, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/809,035

(22) Filed: Nov. 10, 2017

(65) Prior Publication Data
US 2018/0067733 A1 Mar. 8, 2018

Related U.S. Application Data

(63) Continuation of application No. 14/639,738, filed on Mar. 5, 2015, now Pat. No. 9,836,294, which is a
(Continued)

(51) Int. Cl.
G06F 9/44 (2018.01)
G06F 9/445 (2018.01)
(Continued)

(52) U.S. Cl.
CPC ............ *G06F 8/60* (2013.01); *G06F 11/3423* (2013.01); *G06F 11/1464* (2013.01);
(Continued)

(58) Field of Classification Search
CPC .... G06F 8/60; G06F 11/3424; G06F 11/3409; G06F 11/1464; G06F 11/3452; G06F 11/3466; G06F 2201/81; Y02D 10/42
See application file for complete search history.

(56) References Cited

U.S. PATENT DOCUMENTS 5,072,376 A    12/1991  Ellsworth
5,838,962 A *  11/1998  Larson .................. G06F 9/3844
                                                      712/239
(Continued)

OTHER PUBLICATIONS

Sumanth J.V, Adaptive Load Balancing for Long-Range MD Simulations in a Distributed Environment, 2006, pp. 1-10. https://ieeexplore.ieee.org/stamp/stamp.jsp?tp=&arnumber=1690614 (Year: 2006).*

(Continued)

*Primary Examiner* — Mongbao Nguyen
(74) *Attorney, Agent, or Firm* — Griffiths & Seaton PLLC

(57) ABSTRACT

Exemplary embodiments for deploying code in a computing sysplex environment are provided. In one embodiment, by way of example only, a system-wide trending mechanism is applied. At least one of an idle time and a low Central Processing Unit (CPU) utilization time of one system in the sysplex environment is matched with an estimated deployment time obtained from at least one of a latest measured period of time and a calculated time trend. A system-wide coordinating mechanism is applied. A staggered code deployment operation is recommended for at least one node of the system at an optimum system time generated from the matching.

6 Claims, 8 Drawing Sheets

Related U.S. Application Data continuation of application No. 13/779,855, filed on Feb. 28, 2013, now Pat. No. 9,003,401, which is a continuation of application No. 13/345,594, filed on Jan. 6, 2012, now Pat. No. 8,713,562.

(51) Int. Cl.
*G06F 8/60* (2018.01)
*G06F 11/34* (2006.01)
*G06F 11/14* (2006.01)

(52) U.S. Cl.
CPC ...... *G06F 11/3409* (2013.01); *G06F 11/3452* (2013.01); *G06F 11/3466* (2013.01); *G06F 2201/81* (2013.01); *Y02D 10/42* (2018.01)

(56) References Cited

U.S. PATENT DOCUMENTS

| | | | |
|---|---|---|---|
| 6,477,484 B1 | 11/2002 | Hachmeister | |
| 6,557,100 B1 | 4/2003 | Knutson | |
| 6,658,473 B1 | 12/2003 | Block et al. | |
| 7,174,468 B2* | 2/2007 | Gary | G06F 1/26 713/300 |
| 7,240,342 B1* | 7/2007 | Bharadwaj | G06F 8/41 717/145 |
| 7,343,590 B2* | 3/2008 | Tormey | G06F 9/45533 717/131 |
| 7,421,592 B1* | 9/2008 | Kadatch | G06F 11/3423 707/999.01 |
| 7,788,511 B2* | 8/2010 | Gary | G06F 1/3203 713/300 |
| 7,831,325 B1* | 11/2010 | Zhang | G06F 9/5044 700/108 |
| 8,046,826 B2* | 10/2011 | Sheehan | G06F 21/629 726/6 |
| 8,108,855 B2* | 1/2012 | Dias | G06F 9/5077 709/203 |
| 8,341,617 B2* | 12/2012 | Bunn | G06F 8/656 717/168 |
| 8,464,246 B2* | 6/2013 | Davies | G06F 8/61 717/174 |
| 8,578,348 B2* | 11/2013 | Fliess | G06F 8/70 717/135 |
| 8,593,463 B2* | 11/2013 | Jarrett | G06F 9/5094 345/473 |
| 8,627,317 B2* | 1/2014 | Altman | G06F 11/3419 718/100 |
| 8,656,380 B1 | 2/2014 | Asgeirsson et al. | |
| 8,826,077 B2* | 9/2014 | Bobak | G06F 11/0709 714/26 |
| 8,949,772 B1* | 2/2015 | Talby | G06F 8/35 717/104 |
| 9,086,917 B1* | 7/2015 | Fitzgerald | G06F 8/60 |
| 9,098,333 B1* | 8/2015 | Obrecht | G06F 9/50 |
| 9,229,902 B1 | 1/2016 | Leis et al. | |
| 9,483,258 B1* | 11/2016 | Labat | G06F 8/65 |
| 2002/0087291 A1 | 7/2002 | Cooper | |
| 2002/0087587 A1 | 7/2002 | Vos et al. | |
| 2003/0140139 A1 | 7/2003 | Marejka et al. | |
| 2004/0139294 A1 | 7/2004 | Colvig et al. | |
| 2004/0221289 A1 | 11/2004 | D'Souza et al. | |
| 2005/0120111 A1 | 6/2005 | Bailey et al. | |
| 2006/0020944 A1 | 1/2006 | King et al. | |
| 2006/0031691 A1* | 2/2006 | Bacchus | G06F 1/3228 713/300 |
| 2006/0143486 A1 | 6/2006 | Lamdan et al. | |
| 2006/0156271 A1 | 7/2006 | Goncharenko et al. | |
| 2006/0190938 A1 | 8/2006 | Capek et al. | |
| 2006/0200546 A9 | 9/2006 | Bailey et al. | |
| 2007/0088755 A1* | 4/2007 | Nesbitt | G06F 17/30123 |
| 2007/0220298 A1 | 9/2007 | Gross et al. | |
| 2007/0283282 A1 | 12/2007 | Bonfiglio et al. | |
| 2008/0091978 A1 | 4/2008 | Brodsky et al. | |
| 2008/0184241 A1 | 7/2008 | Headrick et al. | |
| 2008/0201702 A1 | 8/2008 | Bunn | |
| 2008/0221941 A1 | 9/2008 | Cherkasova et al. | |
| 2008/0255807 A1 | 10/2008 | Gross et al. | |
| 2008/0271038 A1 | 10/2008 | Rolia et al. | |
| 2008/0320109 A1 | 12/2008 | Andrews et al. | |
| 2009/0150878 A1 | 6/2009 | Pathak et al. | |
| 2009/0217282 A1 | 8/2009 | Rai et al. | |
| 2009/0327854 A1 | 12/2009 | Chhajer et al. | |
| 2010/0250642 A1 | 9/2010 | Yellin et al. | |
| 2010/0251256 A1 | 9/2010 | Soules et al. | |
| 2011/0016342 A1 | 1/2011 | Rowan et al. | |
| 2011/0069649 A1 | 3/2011 | Gobriel et al. | |
| 2011/0283269 A1 | 11/2011 | Gass et al. | |
| 2011/0283270 A1 | 11/2011 | Gass et al. | |
| 2011/0293639 A1 | 12/2011 | Gass et al. | |
| 2011/0296391 A1 | 12/2011 | Gass et al. | |
| 2011/0321028 A1* | 12/2011 | Evans | G06F 8/61 717/170 |
| 2012/0029901 A1* | 2/2012 | Nielsen | G06F 9/542 703/22 |
| 2012/0030502 A1* | 2/2012 | Rueegg | G06F 11/1433 714/4.1 |
| 2012/0144235 A1* | 6/2012 | Bodke | G06F 11/203 714/19 |
| 2013/0055237 A1 | 2/2013 | Fei et al. | |
| 2013/0227547 A1 | 8/2013 | Little | |

OTHER PUBLICATIONS

Bruno Donassolo, Non-Cooperative Scheduling Considered Harmful in Collaborative Volunteer Computing Environments, 2011, pp. 1-10. http://mescal.imag.fr/membres/arnaud.legrand/articles/2011-ccgrid-donassolo.pdf (Year: 2011).*

Scott Banachowski, Integrating Best-effort Scheduling into a Real-time System, 2004, pp. 1-12. https://ieeexplore.ieee.org/stamp/stamp.jsp?tp=&arnumber=1381302 (Year: 2004).*

Helio Silva, Conillon: A lightweight distributed computing platform for desktop grids, 2011, pp. 1-6. https://ieeexplore.ieee.org/stamp/stamp.jsp?tp=&arnumber=5974202 (Year: 2011).*

Hyungwook Park, A Fast Hybrid Time-Synchronous/Event Approach to Parallel Discrete Event Simulation of Queuing Networks, 2008, pp. 795-802. https://ieeexplore.ieee.org/stamp/stamp.jsp?tp=&arnumber=4736142 (Year: 2008).*

Nikos Anastasiadis, An Industrial Deployment of a Real Time Power Aware Scheduler, 2011, pp. 1-4. https://ieeexplore.ieee.org/stamp/stamp.jsp?tp=&arnumber=6059193 (Year: 2011).*

Rich Wolski, Predicting the CPU Availability of Time-shared Unix Systems on the Computational Grid, 1999, pp. 105-111. https://ieeexplore.ieee.org/stamp/stamp.jsp?tp=&arnumber=805288 (Year: 1999).*

Raffaele Bolla, Theoretical and Technological Limitations of Power Scaling in Network Devices, 2010, pp. 37-42. https://ieeexplore.ieee.org/stamp/stamp.jsp?tp=&arnumber=5680253 (Year: 2010).*

Cassier et al., "System Programmer's Guide to: Workload Manager," Retrieved on May 13, 2014 from the internet: <URL: http://www.redbooks.ibm.com/redbooks/pdfs/sg246472.pdf>, pp. 1-370.

Downey, "Using Queue Time Predictions for Processor Allocation," Retrieved from the internet: <URL: http://link,springer.com/content/pdf/10.1007%2F3-540-63574-2_15.pdf>, pp. 35-57, 1997.

Aydin et al., "Power-Aware Scheduling for Periodic Real-Time Tasks," Retrieved from the Internet : <URL: http://ieeexplore.ieee.org/stamp/stamp/jsp?tp=&arnumber=1275298>, IEEE, Retrieved Jul. 23, 2013, pp. 584-600.

Carrera et al., "Conserving Disk Energy in Network Servers," Retrieved from the Internet on Jul. 24, 2017, http://delivery.acm.org/10.1145/790000/782829/p86-carrera.pdf, pp. 86-97, 2003.

Sharma et al., "Blink: Managing Server Clusters on Intermittent Power," Retrieved from the Internet on Jul. 24, 2017, http://none.cs.umass.edu/papers/pdf/asplos2011.pdf, pp. 1-14, 2011.

Ge et al., "Performance-constrained Distributed DVS Scheduling for Scientific Applications on Power-aware Clusters," Retrieved from the Internet on Jul. 24, 2017, http://ieeexplore.ieee.org/stamp/stamp.jsp?arnumber=1559986, pp. 1-11, 2005.

(56) References Cited

OTHER PUBLICATIONS

Feller et al., "Snooze: A Scalable, Fault-Tolerant and Distributed Consolidation Manager for Large-Scale Clusters," Retrieved from the Internet on Jul. 24, 2017, http://delivery.acm.org/10.1145/1960000/1953547/4331a125.pdf, pp. 125-132, 2010.

* cited by examiner

500

Date: Friday, March 18, 2011
Hour 1
   Activity type(s) backup, replication
   priority
   Avg CPU utilization
   Avg Disk utilization
Avg Network utilization (throughout) for each link
Hour 2 - idle
.
.
Hour 23 - idle
Hour 24 - idle

FIG. 5

Site A Activity History — 602

T=0-1, backup, replicate, cleanup
T=1-2, backup, replicate, cleanup
T=2-3, backup, replicate, cleanup
T=3-4, backup, replicate, cleanup
T=4-5, backup, replicate, cleanup
T=5-6, backup, replicate, cleanup
T=6-7, backup, replicate, cleanup
T=7-8, idle
T=8-9, idle
T=9-10, replicate
T=10-11, replicate
T=11-12, replicate
T=12-13, replicate
T=13-14, replicate
T=14-15, replicate
T=16-17, replicate
T=17-18, cleanup, replicate
T=18-19, replicate
T=19-20, replicate
T=20-21, replicate
T=21-22, cleanup, replicate
T=22-23, idle
T-23-0, idle

Site B Activity History — 604

T=0-1, replicate, cleanup
T=1-2, replicate, cleanup
T=2-3, replicate, cleanup
T=3-4, replicate, cleanup
T=4-5, replicate, cleanup
T=5-6, replicate, cleanup
T=6-7, replicate, cleanup
T=7-8, cleanup
T=8-9, idle
T=9-10, backup, replicate, cleanup
T=10-11, backup, replicate, cleanup
T=11-12, backup, replicate, cleanup
T=12-13, backup, replicate, cleanup
T=13-14, backup, replicate, cleanup
T=14-15, backup, replicate, cleanup
T=16-17, backup, replicate, cleanup
T=17-18, backup, replicate, cleanup
T=18-19, replicate, cleanup
T=19-20, replicate, cleanup
T=20-21, replicate, cleanup
T=21-22, replicate, cleanup
T=22-23, cleanup
T-23-0, idle

Site C Activity History — 606

T=0-1, replicate, cleanup
T=1-2, replicate, cleanup
T=2-3, replicate, cleanup
T=3-4, replicate, cleanup
T=4-5, replicate, cleanup
T=5-6, replicate, cleanup
T=6-7, replicate, cleanup
T=7-8, cleanup
T=8-9, idle
T=9-10, replicate, cleanup
T=10-11, replicate, cleanup
T=11-12, replicate, cleanup
T=12-13, replicate, cleanup
T=13-14, replicate, cleanup
T=14-15, replicate, cleanup
T=16-17, replicate, cleanup
T=17-18, cleanup, replicate
T=18-19, backup, replicate, cleanup
T=19-20, backup, replicate, cleanup
T=20-21, backup, replicate, cleanup
T=21-22, cleanup, replicate, cleanup
T=22-23, idle
T-23-0, idle

INTELLIGENT AND AUTOMATED CODE DEPLOYMENT

CROSS REFERENCE TO RELATED APPLICATIONS

This Application is a Continuation of U.S. patent application Ser. No. 14/639,738, filed on Mar. 5, 2015, which is a Continuation of U.S. Pat. No. 9,003,401, filed on Feb. 28, 2013, which is a Continuation of U.S. Pat. No. 8,713,562, filed Jan. 6, 2012, each of which are incorporated herein, by reference.

FIELD OF THE INVENTION

The present invention relates generally to computers, and more particularly, to implementing code deployment operations in a computing environment.

DESCRIPTION OF THE RELATED ART

In today's society, computer systems are commonplace. Computer systems may be found in the workplace, at home, or at school. Computer systems may include data storage systems, or disk storage systems, to process and store data. In recent years, both software and hardware technologies have experienced amazing advancement, as well as the need to accommodate increasing amounts of data processed by such technologies. As a result, various interconnection data processing devices are configured in so-called "sysplex" environments, where interconnected computer systems accommodate, store, and otherwise process information.

SUMMARY OF THE DESCRIBED EMBODIMENTS

With increasing demand for faster, more powerful and more efficient ways to store information, optimization of storage technologies is becoming a key challenge. Included in this challenge is a need to optimize the way that computer code, or the instructions for implementing software applications and/or operating the hardware thereby associated, is deployed to the various computer sysplexes.

Accordingly, and in view of the foregoing, exemplary embodiments for deploying code in a computing sysplex environment are provided. In one embodiment, by way of example only, a system-wide trending mechanism is applied. At least one of an idle time and a low Central Processing Unit (CPU) utilization time of one system in the sysplex environment is matched with an estimated deployment time obtained from at least one of a latest measured period of time and a calculated time trend. A system-wide coordination mechanism is applied. A staggered code deployment operation is recommended for at least one node of the system at an optimum system time generated from the matching. Data obtained from the code deployment operation is recorded, including a new latest measured period of time and the data used to generate an updated time trend. The new latest measured period of time and the updated time trend is utilized in a subsequent matching operation for another system in the sysplex environment for a subsequent code deployment operation. Further, a predetermined tracking period is established for the one system for one of a calculated and specified time interval, where the matching is performed at least once during the predetermined tracking period.

In addition to the foregoing exemplary embodiment, other exemplary embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which:

FIG. 5 is an exemplary sample activity history file;

FIG. 6 illustrates exemplary activity history tracking;

DETAILED DESCRIPTION OF CERTAIN EMBODIMENTS

Enterprise computing environments may include sysplex architectures such as the ProtecTIER® backup/restore/replication architecture distributed by International Business Machines Corporation ("IBM®"). As shown in an exemplary embodiment presented in FIG. 1, following, an exemplary architecture 100 may include a customer site 102 having multiple ProtecTIER® DD4 gateway configurations (e.g., systems 104, 110, 112, and 114), and multiple ProtecTIER® AP1 appliance configurations (e.g., systems 106 and 108). Each configuration runs the ProtecTIER® application software and specific firmware levels for the hardware components contained in each respective configuration.

Figure 1:
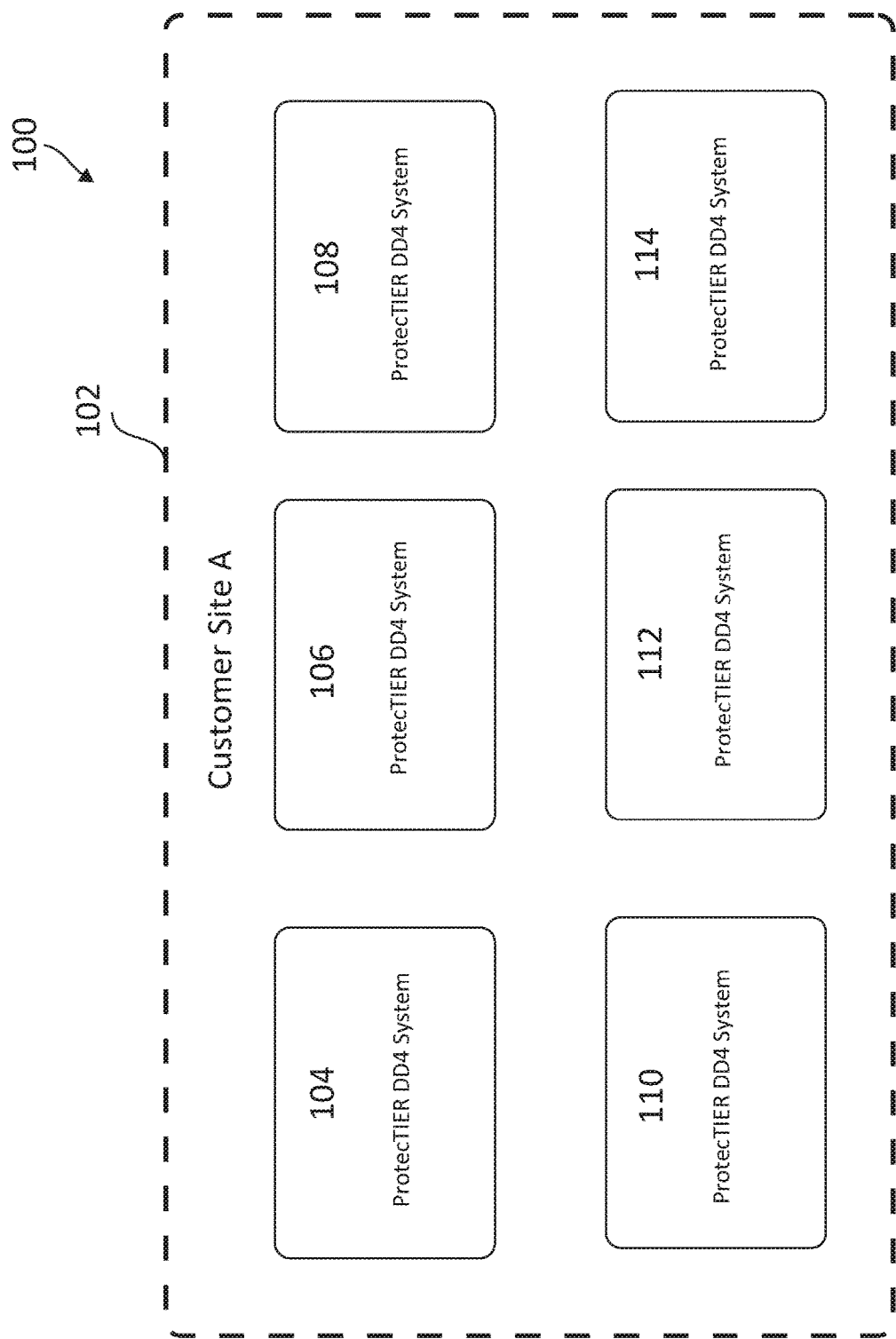
FIG. 1 illustrates an exemplary computer sysplex environment in which aspects of the present invention may be realized.

Users, such as customers, may have multiple site, sysplex-type environments described in FIG. 1, where a first system at Site A replicates and/or otherwise processes data to another system at one or more remote sites in a bi-directional manner. Each system in the sysplex architecture has a limited amount of resources and, in one exemplary embodiment, support the following activities: receiving backup data from a host, restoring backup data from a host, replicating data to a remote system, receiving replication from a remote system, maintaining the logical ProtecTIER storage fragmentation, as well as support routine maintenance activities such as performing code and firmware upgrades.

The following illustrated embodiments serve to address various challenges pertaining to streamlining the code/firmware upgrade process between multiple systems that span, for example, multiple sites. For example, today users must visit a support website and manually download new code images to be applied to their respective systems, and must manually apply the code upgrades to each system. Typically, while performing this action, a service outage must be scheduled at a time that limits impact to production activity, such as backing up new production data, replicating production data to a remote site, etc., in order to ensure backup windows are met.

Such activities place burdens on customers as they have to plan the code upgrade activity and is prone to human error. For example, a customer may download the wrong package or apply the wrong package to a system, or may schedule an upgrade during a time of peak production utilization. This process can be tedious and not user friendly and is potentially worsened as the sysplex becomes larger or more interconnected as more systems and additional complexity must be managed.

One possible solution to this problem is the code upgrade procedure implemented for IBM® Scale Out Network Attached Storage (SONAS) systems. In this procedure, a code upgrade image is loaded onto a management node and an algorithm performs a 'rolling code upgrade' by analyzing the physical characteristics of the SONAS system, taking into account the built in error recovery of the system architecture. For example, the method utilizes the failover capabilities of a component referred to as Clustered Trivial Databases (CTDB) to perform code upgrades in a manner that allows customers to still access their data throughout the code upgrade process. This code upgrade process, does not take into account resource utilization, does not take into account multiple SONAS systems that may be at the same or remote locations and does not automatically determine what code images are needed and automatically download from a centralized service center, however.

As such a novel solution is needed that addresses the following shortcomings of the current state of the art. The solution should address the following elements:
(1) Learning the optimal window (time) to perform code upgrades on multiple systems taking into account a multitude of production activities such as backup/restore, replication such that impact to production activities is minimized.
(2) Automatically coordinating code upgrades among multiple systems at the same or different customer sites.
(3) Automatically identifying, downloading, and deploying new code and firmware images and fixes from a centralized support center, taking into account the urgency of each fix.

The illustrated embodiments, for example, serve to automatically learn backup, restore, disk maintenance (defrag), and replication utilization for multiple systems in a sysplex, recommend an upgrade schedule to the customer based on their specific environment and usage, and download and notify users of new code releases and firmware updates from a centralized service center. This is accomplished by automatically detecting new firmware and software updates from an external centralized code repository, determining idle time for each system in a customer sysplex and based on the estimated time to perform the upgrade coupled with the idle time for each system, provides a recommended upgrade strategy that minimizes the impact to production activities. Customers may elect to allow the code upgrade algorithms to automatically apply updates, providing a truly automated, intelligent lights out implementation or customers may elect to review, modify and approve the derived code upgrade strategy for all systems in their sysplex.

One aspect of the illustrated embodiments involves an ability to dynamically identify/learn free windows by trending system activity over time and making educated predictions to future free windows via code automation. Users may also assign different priorities to different production tasks in a time period, which can then be used to determine the optimal code, upgrade schedule based on production task priorities.

In this manner, the illustrated embodiments apply system-wide threshold based trending mechanisms adapted to backup, restore, and replication for disaster recovery environments. In one such embodiment, a trending algorithm identifies backup, restore, and replication usage according to idle time on the same day that spans consecutive previous weeks. The trending algorithm may incorporate a forward-looking histogram that uses the latest system activity as the precedence and attempts to match previous system activity to the latest system activity. In addition, the illustrated embodiments provide system-wide coordination of activities based on predicted idle times as multiple nodes in a system share resources among each other due to activities such as replication. To this end, in one embodiment, a system-wide staggered code update schedule is applied to prevent all nodes from being upgraded at the same time, even if they have the same idle time windows. In addition, the schedule is optimized to provide the fastest point in time where code upgrades can be completed for all nodes in a particular system by identifying the earliest code upgrade window and subsequent non-overlapping code upgrade windows.

The illustrated embodiments track code upgrade failures in a system, and if number of failures encountered when upgrading a particular code image crosses a configurable threshold, refrain from upgrades on additional systems. Additionally, the illustrated embodiments, enable tight integration with a backup application to define when code upgrades can take place, enable users to define priority of runtime tasks such that if runtime tasks conflict with code upgrades, the upgrades can be automatically scheduled based on runtime task priority/importance, and provide a recommended system wide upgrade schedule to the user and allow the user to modify the schedule and allow the invention to automatically upgrade the nodes in the system or the user may use the schedule as a guide to manually perform the upgrades.

Figure 2:
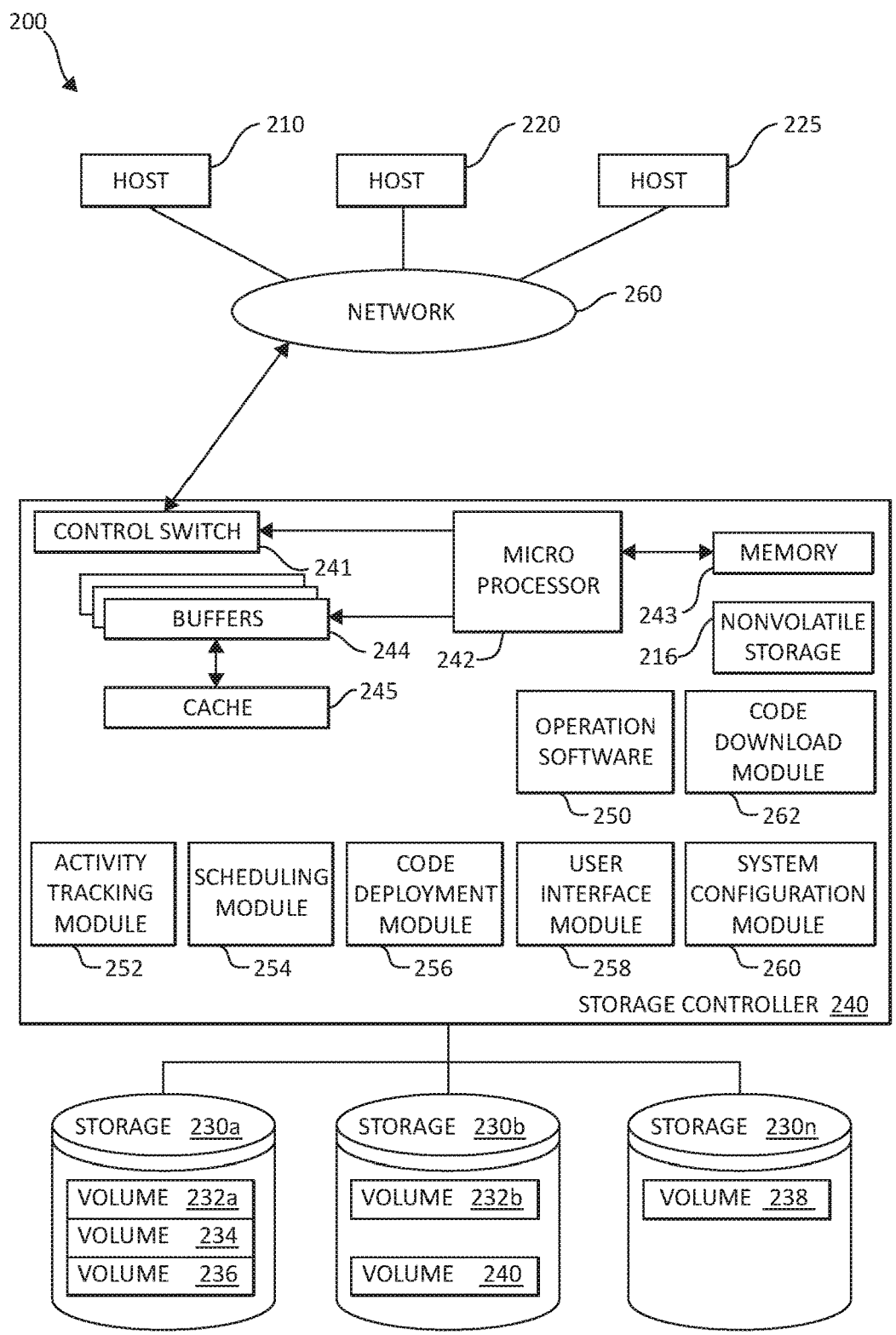
FIG. 2 is a block diagram showing an exemplary hardware structure of a data storage system in a computer system in which aspects of the present invention may be realized.

The illustrated embodiments introduce several modules that work in conjunction to provide intelligent, workload optimized, automated code upgrade scheduling and deployment, and are depicted in FIG. 2, following:
(1) Activity tracking module—Tracks the type of activity, start/stop times, resource utilization (disk, CPU, network, etc.), priority (optional), and keeps a historical record of activity on a particular system.
(2) Code download module—Responsible for identifying new code images available from the centralized service point based on the type of system(s) at the customer site and their current code levels.
(3) Scheduling module—Contains built in intelligence that uses the history file provided by the activity tracking module on multiple systems to identify trends and predict system idle time. After building a trend of idle times the algorithm determines if the number of consecutive idle times meets pattern identification criteria and filters out idle times that do not match. The module then takes into account the code upgrade images that are needed along with a time estimation of how long each upgrade is expected to take from the code download module and derives an upgrade schedule for each unique customer environment.

(4) User interface module—Provides a user interface for configuration and monitoring associated with automated code upgrade.

(5) Deployment module—Responsible for propagating code images to multiple systems at the customer site and initiates and manages the code upgrades according to the schedule provided by the scheduling module. Monitors progress of code upgrades by tracking the actual code upgrade duration and detects code upgrade failures. This is provided as feedback to the scheduling module such that the scheduling module can dynamically adjust the upgrade strategy according to fluctuations in the actual code upgrade timing in order to further minimize impact to production activities and also to account for propagating bad code if code upgrade failures are detected.

(6) System configuration module—An XML file is provided that contains configuration information that the invention uses. This contains information such as the time interval at which to track activity, the threshold of consecutive idle times at which the algorithm determines is an idle pattern.

FIG. 2 is an exemplary block diagram showing a hardware structure of an exemplary data storage system 200, in which elements of the present invention may be implemented. In one embodiment, a customer site 102 (FIG. 1) may include various elements of FIG. 2. One of ordinary skill in the art will appreciate, however, that the various components of FIG. 2 may vary according to a particular configuration and/or application. Host computers 210, 220, 225, are shown, each acting as a central processing unit for performing data processing as part of a data storage system 200. The hosts (physical or virtual devices), 210, 220, and 225 may be one or more new physical devices or logical devices to accomplish the purposes of the present invention in the data storage system 200. A network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 2 comprising storage controller 240 and storage 230.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 may be comprised of one or more storage devices, such as storage arrays, which are connected to storage controller 240 by a storage network.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data which the processor 242 may access for executing functions and method steps associated with managing storage 230 and executing various functionality relating to code deployment according to the illustrated embodiments. In one embodiment, system memory 243 includes, is associated, or is in communication with the operation software 250 for performing the code deployment functionality described below, including the methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described herein.

In some embodiments, cache 245 is implemented with a volatile memory and nonvolatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include the specialized modules previously described, such as activity tracking module 252, scheduling module 254, code deployment module 256, user interface module 258, system configuration module 260, and code download module 262 as shown. The modules 252, 254, 256, 258, 260, and 262 may work in conjunction with each and every component of the storage controller 240, the hosts 210, 220, 225, and storage devices 230. Modules 252, 254, 256, 258, 260, and 262 may be structurally one complete module or may be associated and/or included with other individual modules. The modules 252, 254, 256, 258, 260, and 262 may also be located in the cache 245 or other components, as one of ordinary skill in the art will appreciate.

In the depicted embodiment, storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, cache 245 for temporarily storing (buffering) data, and buffers 244 for assisting the cache 245 to read and write data, a control switch 241 for controlling a protocol to control data transfer to or from the storage devices 230, and modules 252, 254, 256, 258, and 260. Multiple buffers 244 may be implemented with the present invention to assist with the operations as described herein.

In one embodiment, the host computers or one or more physical or virtual devices, 210, 220, 225 and the storage controller 240 are connected through a network adaptor (this could be a fibre channel) 260 as an interface i.e., via a switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, modules 252, 254, 256, 258, 260, and 262 are in communication with each other and may be separate or one individual component(s). Also, several, if not all of the components, such as the operation software 250 may be included with the memory 243. Each of the components within the devices shown may be linked together and may be in communication with each other for purposes suited to the present invention.

Figure 3:
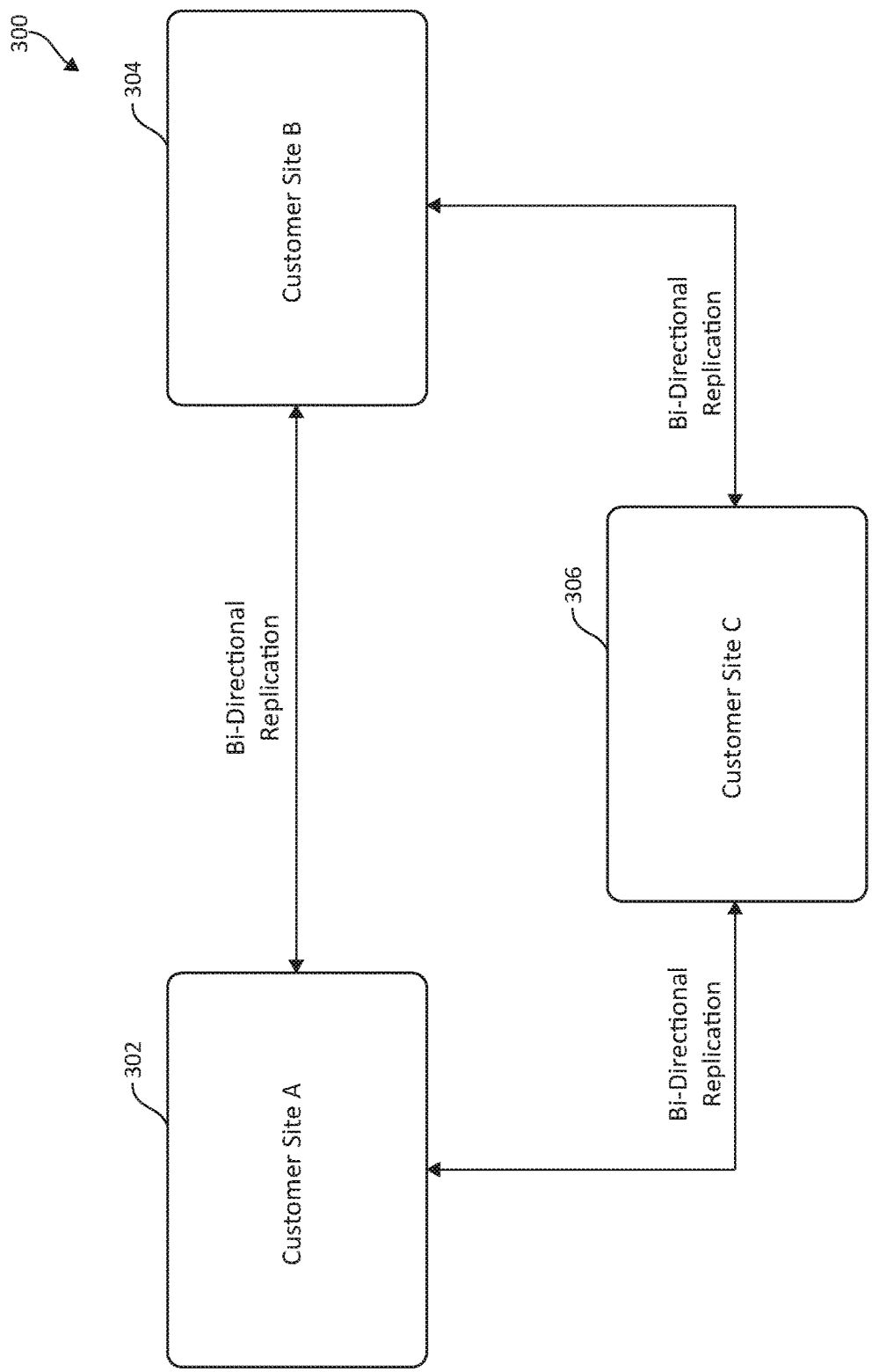
FIG. 3 is a block diagram illustration of multi-site bi-directional data replication, again in which aspects of the present invention may be implemented.

One exemplary embodiment of the present invention comprises three customer sites (Sites A, B, C), where each site contains one DD4 cluster as shown in FIG. 1, previously. FIG. 3, following, illustrates such an exemplary embodiment 300. Sites, 302, 304, and 306 (A, B, and C) are located remotely from one another and perform bi-directional replication operations as shown. Specifically, Customer site A receives local backups and replicates the locally backed up data to customer sites B and C. Customer site B receives local backups and replicates the locally backed up data to customer sites A and C. Customer site C receives local backups and replicates the locally backed up data to customer sites A and B.

Figure 4:
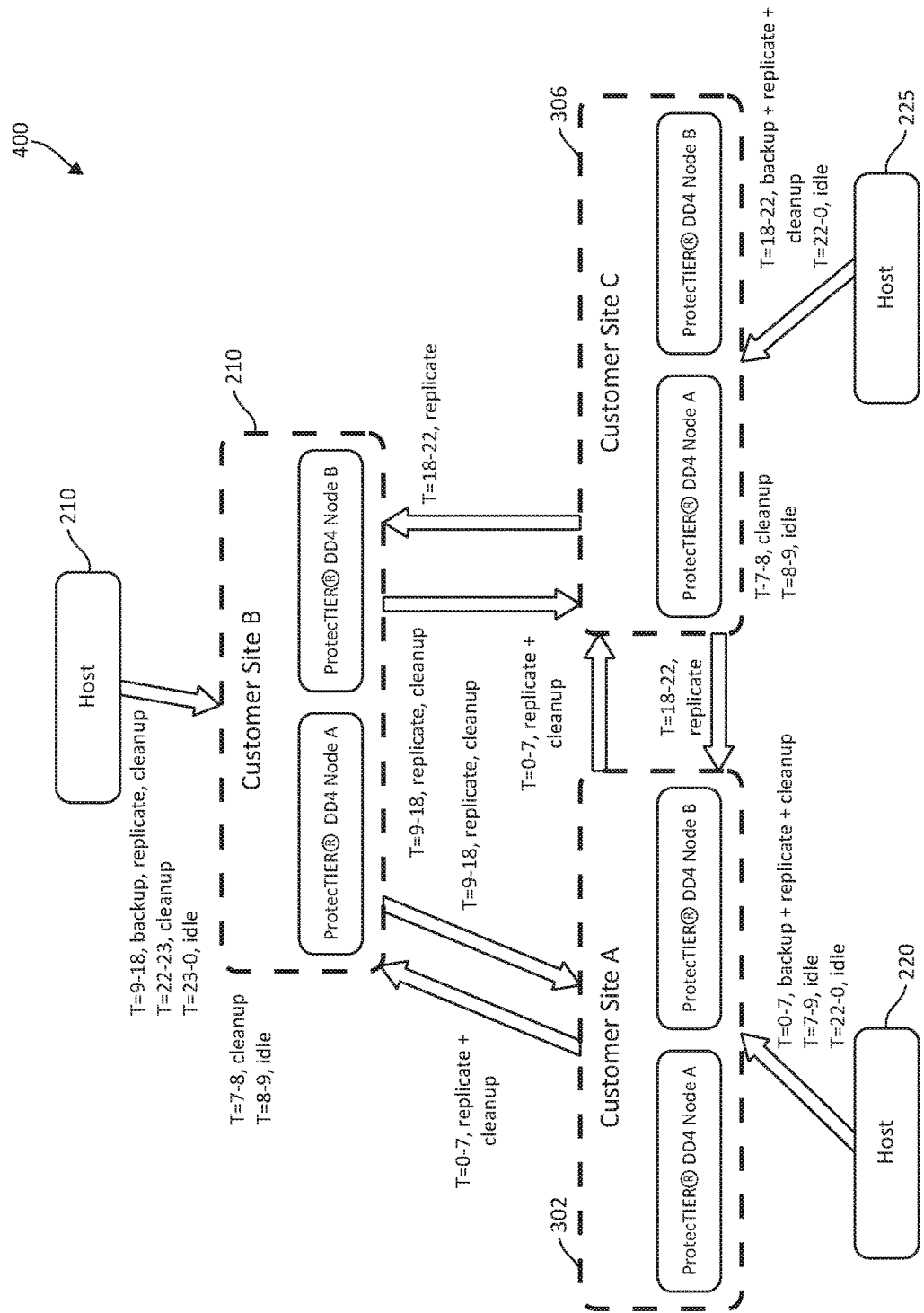
FIG. 4 is a block diagram illustration of backup, replication, and cleanup operations as performed by a multi-site sysplex computing environment, again in which aspects of the present invention may be realized.

Turning now to FIG. 4, sites 302, 304, and 306 (A, B, and C) are shown performing exemplary replication, backup, and cleanup operations in conjunction with hosts 210, 220, and 225 as will be further described. From time T=0-T=7, site A receives local backups, replicates to sites B and C and also runs a disk cleanup process. During time T=7-T=8 site A is idle but sites B and C are still busy running a disk cleanup activity. During time T=8-T=9, sites A, B, and C are all idle. During time T=9-T=18, site B receives local backups, replicates to sites A and C and also runs a disk cleanup process. During time T=18-T=22 site C receives local backups, replicates to sites A and B and also runs a disk cleanup process. During time T=22-T=23 sites A and C are idle but site B is running a cleanup process. During time T=23-T=0 all sites are idle.

Referring briefly to FIG. 2, the activity tracking module 252 may run as a daemon on each system monitoring system activity and saving output to a history file over an extended period of time. FIG. 5, following provides a sample of the type of information tracked and stored in the history file. The granularity of the tracking is configurable in the system configuration module 260 (again, FIG. 2). For example the system configuration module 260 may set the tracking period to every 15 minutes. A CLI is provided to update the system configuration module 260 such that the scheduling module 254 is notified of the configuration change, causing it to reread the configuration information and adjust the tracking algorithm accordingly.

FIG. 6, following, illustrates an example of an activity history file for one day (Monday) on each system (files 602, 604, and 606) according to the embodiment and use case described in FIG. 4, previously. It should be noted that the entire content of the history file as indicated in FIG. 6 applies to FIG. 5 but is not shown in its entirety.

According to one exemplary embodiment the code download module 262 (again, FIG. 2) determines that each customer site is running the 2.5 ProtecTIER® software, but a critical fix is available from the support center (denoted as 2.5.1). After determining that new code images are available, the code download module 262 downloads the image from a support center to the master/coordinating node, which in this case is site A.

After downloading the code image from the support center, the code download module 262 notifies the scheduling module 254 of the new code image for each site and the estimated upgrade time of 45 minutes. In one exemplary embodiment, there is a centralized scheduling module running on site A that calls the activity tracking daemons on each system asking for the activity history. The scheduling module 254 scans the activity history for each system and builds a site wide view of idle time by applying a trending algorithm adapted to backup and restore environments. Typically in backup and restore environments customers will perform some type of daily backup that may be a full or incremental and may also replicate the backed up data to one or more remote sites. This activity can be tracked over time and trends can be identified. For example, every night a customer may perform backups+replication for 5 hours. A trend may be established over as little as two consecutive instances of activity during the same time period. In my invention tracking is established from day 1 such that by the time a code upgrade is available, sufficient data pertaining to system utilization has been collected and potential code upgrade windows that minimize impact to production activities may be established.

Figure 7:
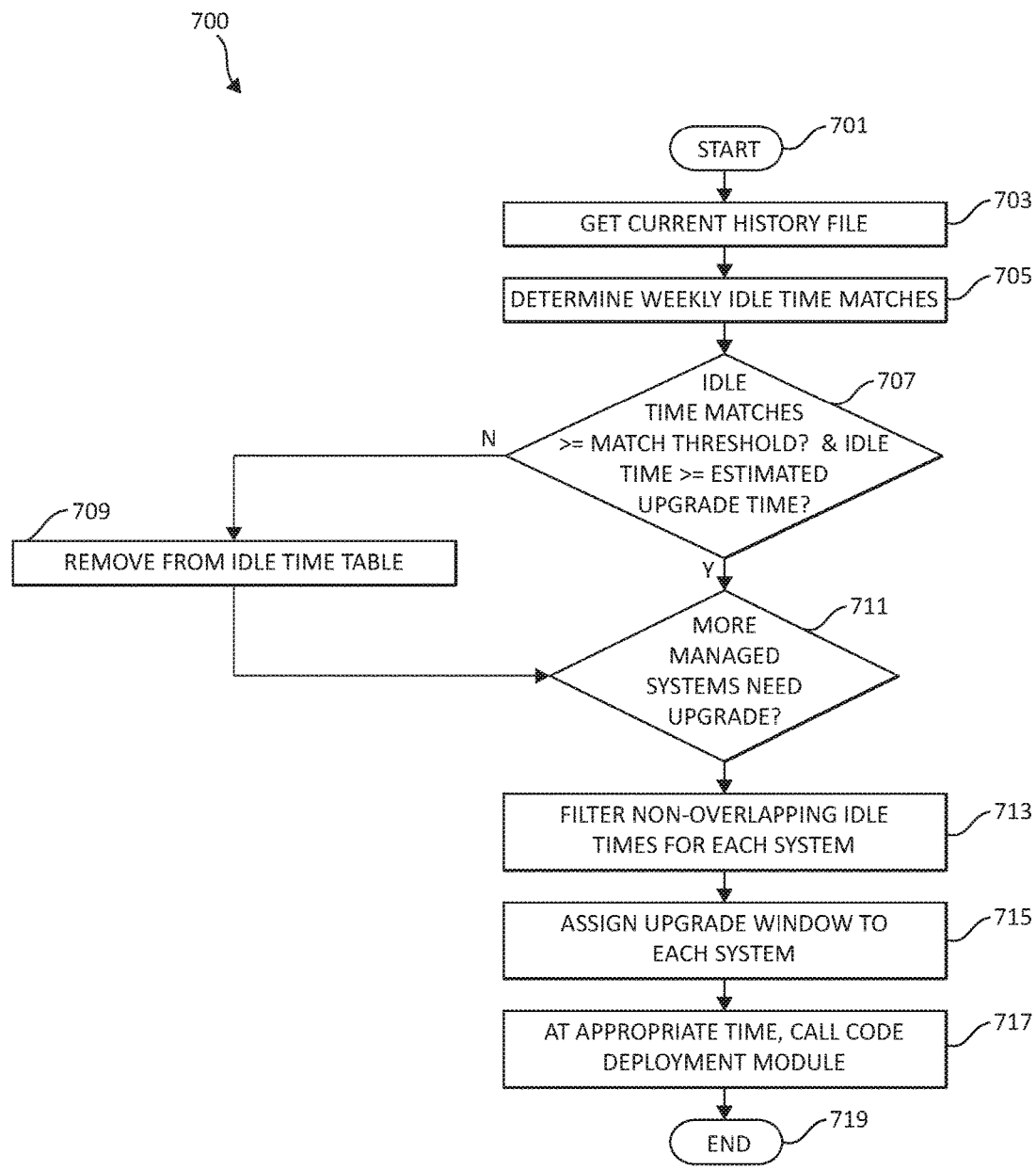
FIG. 7 is a flow chart diagram of an exemplary method for trend identification in which aspects of the present invention may be realized.

Specifically, the exemplary learning algorithm 700 described in FIG. 7, following, attempts to identify the backup/restore/replication usage according to idle time on the same day that spans consecutive previous weeks. At step 701 the scheduling module algorithm starts. At step 703 the scheduling algorithm gets the current history file from site A's DD4 cluster via the activity tracking module.

At step 705 the scheduling algorithm 700 determines the weekly idle time matches. For example, the algorithm 700 will compare the history file of the current Monday to the previous Monday and identify matching idle times. If a match is found between the current week and the previous week, the scheduling module saves this information to an idle time table. The algorithm 700 then looks at the idle time table results comparing the matching idle time frames identified between the current Monday and the previous Monday to the idle times from the same day two weeks ago. This builds a history of consecutive matching idle times. This history of consecutive matching idle times may be embodied in a histogram, for example. The algorithm 700 then proceeds to the next day of the current week and compares this to the previous week(s) until all days are evaluated. For example, a history file for site A may contain 6 weeks worth of data and that the site A activity history file as indicated in FIG. 6, previously, is consistent for the last 5 weeks but was not consistent 6 weeks ago for time T=7-9 and T=22-0. The algorithm 700 then identifies 4 instances of matches for idle times T=7-9 and 4 instances of matches for idle times T=22-0. In an alternative example, the idle times of T=7-9 and T=22-0 for site A are consistent for 4 out of the 5 weeks except that in the third previous week the idle times are not consistent. In that case, the algorithm 700 only considers two instances of matches (current week and 1st previous week, 2nd previous week) even though the current week matches with the 4th previous week.

Returning to the depicted embodiment, in step 707 the algorithm 700 looks at the idle time table and looks to see if the number of matches for each matching time period is greater than or equal to the match threshold contained in the system configuration XML file and also looks to see if the duration of each matching time period is greater than or equal to the estimated code upgrade time. If both conditions are not met, the matching idle time is no longer considered valid and is removed from the idle time table. For example, let's assume that the threshold is set to 3 and since the code upgrade window is 45 minutes, idle times T=7-9 and T=22-0 remain in the idle time table as valid idle windows at which code upgrades could be performed.

At step 711, the algorithm turns focus to site B since the code download module indicated that the DD4 cluster at site B requires an upgrade and proceeds to obtain the current history file as indicated in step 103. Referring to the site B history file in FIG. 6, the current week indicates time T=8-9 and T=23-0 as idle. For the sake of example, assume that these idle times also pertain to Monday and are repeated for 4 consecutive weeks. Step 705 detects these matches using the process described above and the 3 matches of idle times T=8-9 and T=23-0 satisfy the checks at step 707.

Upon returning to step 111, the algorithm turns focus to site C and obtains the current history file (step 103). Referring to the site C history file in FIG. 5, site C is idle at times T=8-9, T=22-0. Again, for the sake of example let's assume this is also Monday for 4 consecutive weeks. Step 105 detects these matches using the process described above and the 4 matches of idle times T=8-9 and T=22-0 satisfy the checks at step 107.

As all systems across multiple sites have been analyzed, the algorithm 700 moves to step 713 with the following information in the idle time table:
T=7-8, site A idle
T=8-9, site A, site B, site C idle
T=22—site A, site C idle
T=23, site A, site B, site C idle At step 713 the algorithm attempts to derive a staggered code upgrade schedule to allow for all nodes to not be upgraded at the same time, even if they have the same idle window. This is to prevent situations where a bad code image is loaded onto multiple machines at once, placing all customer machines into a failed state. Additionally step 713 is optimized to complete code upgrades as fast as possible by finding the earliest code upgrade window and the subsequent non-consecutive code upgrade windows. In one embodiment, the algorithm identifies that time T=7 is the earliest idle time among all systems and applies to site A. Next step 113 identifies time T=8 as the next available time for sites B and C and also identifies time T=22 as idle for site C. As a result, at step 715 the algorithm derives the following code upgrade window assignments:
T=7, site A upgrade
T=8, site B upgrade
T=22 site C upgrade If at step 715 the algorithm 700 is not able to assign an upgrade window to a particular system, the user/customer is notified of this and may manually assign an upgrade window via the user interface module.

In an alternate embodiment, step 713 may optimize to perform code upgrades on all and/or as many systems in parallel as possible. This would result in an upgrade schedule of performing upgrades at time T=8 on sites A, B and C.

At step 717 the scheduling module calls the appropriate code deployment module. For example, according to one embodiment, the scheduling module calls the deployment module at site A at T–7. The code deployment module starts the code upgrade and monitors the progress of the code upgrade and ensures that the upgrade was successful, the system is operational, and tracks the total time required to complete the code upgrade. This information is reported to the scheduling module where the scheduling module may adjust the upgrade schedule according to the outcome of the code upgrade on site A. For example, if the code upgrade on site A failed, the scheduling module may look at the XML, configuration file and determine if the code upgrade failure exceeds a node upgrade failure threshold. If it does, it may refrain from doing future code upgrades with this particular code image. If the time to complete the upgrade was originally estimated at 45 minutes but took an hour and a half, the scheduling module may recalculate a different upgrade schedule based on the time to complete the code upgrade. In this example, site B was scheduled to be upgraded at time T=8-9 but since the actual time to complete the upgrade is longer than an hour, upgrading during that time frame would impact production activity. Instead, the scheduling module may start the next upgrade on site C at time T=22-0 since there is a two hour window available and perform the code upgrade on site B the next day when there is a 2 hour code upgrade time available.

After calling all code deployment modules at the appropriate time, the algorithm ends at step 719.

In an alternate embodiment, the mechanisms of the illustrated embodiments may tightly integrate with the backup application such that when customers schedule backup activities through their backup application (such as Tivoli® Storage Manager or TSM), this information may be relayed to the mechanisms, allowing the invention to utilize the automated scheduling and execution of code upgrades on multiple systems that may span multiple sites.

The mechanisms of the illustrated embodiments may also allow users to configure the priority/importance of tasks through the user interface module such that the scheduling module determines when to perform upgrades based on the priority of tasks during a given time frame. For example, site A might not have any free time but may have low priority activity running from time T=0-4, medium priority tasks running from time T=4-22 and high priority tasks running from time T=22-0. The scheduling module would then identify time T=0 to start the code upgrade.

Alternatively, the scheduling module may determine the optimal time to perform an upgrade based on system resource utilization. For example, CPU, network, and disk utilization might be lowest at time T=3-5 and the scheduling module may identify time T=3 to initiate an upgrade. This may also be employed as a second level trend identification approach only if there are no clear idle times identified.

Last, the mechanisms of the illustrated embodiments may provide a recommended upgrade schedule to the customer and the customer can review and modify the recommended schedule as needed through the user interface module. After modifying the upgrade schedule the customer may allow the invention to automatically apply the code upgrades according to the defined schedule or the customer may simply use the recommended schedule as a guide for the customers to manually perform code upgrades.

Figure 8:
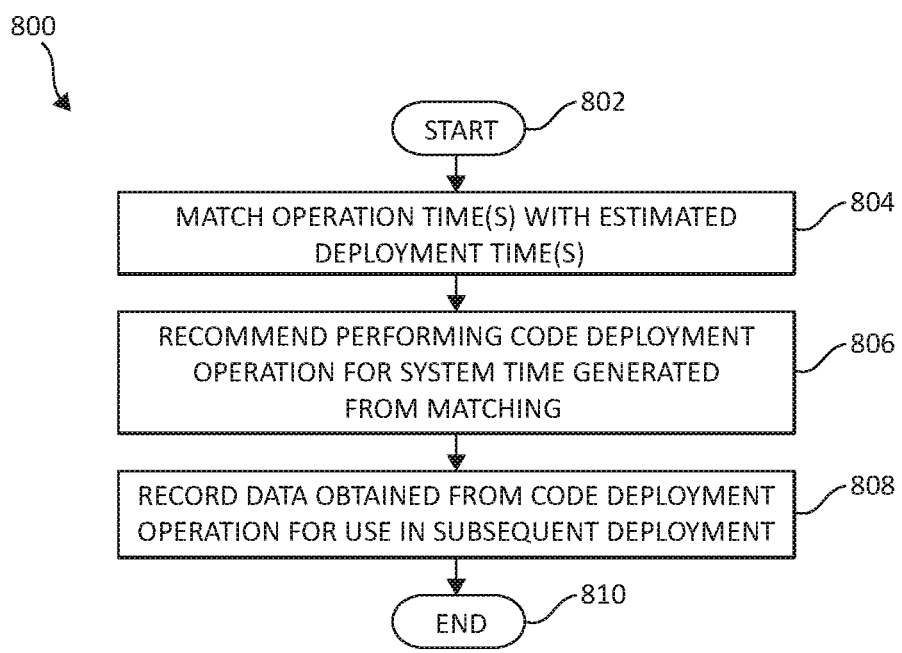
FIG. 8 is an additional flow chart diagram of an exemplary method for code deployment in accordance with one embodiment of the present invention.

FIG. 8, following, is a flow chart of an exemplary method 800 for performing code deployment functionality according to the mechanisms of the illustrated embodiments. Method 800 begins (step 802). At least one of an idle time and a low Central Processing Unit (CPU) utilization time of one system in the sysplex environment is matched with an estimated deployment time obtained from at least one of a latest measured period of time and a calculated time trend (step 804). A code deployment operation is recommended for the system at a system time generated from the matching (step 806). Data obtained from the code deployment operation is recorded, including a new latest measured period of time. The data is used to generate an updated time trend (step 808). The method 800 then ends (step 810).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A system for deploying code in a computing sysplex environment, comprising:
    a processor executing instructions stored in a memory, wherein when executing the instructions, the processor:
        applies a system-wide trending mechanism, including matching at least one of a non-scheduled idle time and a low Central Processing Unit (CPU) utilization time of one system in the sysplex environment with an estimated deployment time obtained from at least one of a latest measured period of time and a calculated time trend;
        applies a system-wide coordination mechanism, including recommending performing a staggered code deployment operation for at least one node of the system at an optimum system time generated from the matching such that the staggered code deployment operation is performed at a time based on the optimum system time in lieu of a time scheduled by an administrator;
        records data obtained from the code deployment operation, including recording a new latest measured period of time, the data used to generate an updated time trend, wherein the new latest measured period of time and the updated time trend is utilized in a subsequent matching operation for another system in the sysplex environment for a subsequent code deployment operation;
        establishes a predetermined tracking period for the one system for one of a calculated and specified time interval, wherein the matching is performed at least once during the predetermined tracking period;
        registers at least one priority for a production task in the code deployment operation, wherein the at least one priority is used in conjunction with the matching to obtain the recommendation; and
        downloads code images to a centralized service point for subsequent deployment to the one system in the sysplex environment.

2. The system of claim 1, wherein the processor obtains a current history file, the current history file including the latest measured period of time.

3. The system of claim 1, wherein the processor configures the current history file as at least one of an Extended Markup Language (XML) file and at least a portion of a histogram for use by the system-wide trending mechanism.

4. A computer program product for deploying code in a computing sysplex environment, by a processor, the computer program product embodied on a non-transitory computer-readable storage medium having computer-readable program code portions stored therein, the computer-readable program code portions comprising:
    an executable portion that applies a system-wide trending mechanism, including matching at least one of a non-scheduled idle time and a low Central Processing Unit (CPU) utilization time of one system in the sysplex environment with an estimated deployment time obtained from at least one of a latest measured period of time and a calculated time trend;
    an executable portion that applies a system-wide coordination mechanism, including recommending performing a staggered code deployment operation for at least one node of the system at an optimum system time generated from the matching such that the staggered code deployment operation is performed at a time based on the optimum system time in lieu of a time scheduled by an administrator;
    an executable portion that records data obtained from the code deployment operation, including recording a new latest measured period of time, the data used to generate an updated time trend, wherein the new latest measured period of time and the updated time trend is utilized in a subsequent matching operation for another system in the sysplex environment for a subsequent code deployment operation;
    an executable portion that establishes a predetermined tracking period for the one system for one of a calculated and specified time interval, wherein the matching is performed at least once during the predetermined tracking period;
    an executable portion that registers at least one priority for a production task in the code deployment operation, wherein the at least one priority is used in conjunction with the matching to obtain the recommendation; and
    an executable portion that downloads code images to a centralized service point for subsequent deployment to the one system in the sysplex environment.

5. The computer program product of claim 4, further including an executable portion that obtains a current history file, the current history file including the latest measured period of time.

6. The computer program product of claim 4, further including an executable portion that configures the current history file as at least one of an Extended Markup Language (XML) file and at least a portion of a histogram for use by the system-wide trending mechanism.

\* \* \* \* \*